US007937988B2

(12) United States Patent
Degler et al.

(10) Patent No.: US 7,937,988 B2
(45) Date of Patent: May 10, 2011

(54) METHOD AND DEVICE FOR CHECKING FOR LEAKAGE IN A FUEL INJECTION VALVE OF AN INTERNAL COMBUSTION ENGINE

(75) Inventors: Traugott Degler, Korntal (DE); Lars Empacher, Kornwestheim (DE); Andreas Hempel, Asperg (DE); Wolfgang Beuer, Stuttgart (DE); Hans-Martin Jaeger, Ludwigsburg (DE); Myriam Howey, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 488 days.

(21) Appl. No.: 11/666,787

(22) PCT Filed: Nov. 10, 2005

(86) PCT No.: PCT/EP2005/055874
§ 371 (c)(1),
(2), (4) Date: Mar. 20, 2008

(87) PCT Pub. No.: WO2006/053852
PCT Pub. Date: May 26, 2006

(65) Prior Publication Data
US 2008/0264157 A1    Oct. 30, 2008

(30) Foreign Application Priority Data

Nov. 18, 2004  (DE) .................. 10 2004 055 575

(51) Int. Cl.
*G01M 15/00* (2006.01)
(52) U.S. Cl. ...................... 73/49.7; 73/114.45
(58) Field of Classification Search ............. 73/114.45, 73/49.7
See application file for complete search history.

(56) References Cited

U.S. PATENT DOCUMENTS

| 5,469,827 A * | 11/1995 | Tomisawa .................. 123/491 |
| 6,142,120 A | 11/2000 | Biester et al. |
| 6,148,800 A * | 11/2000 | Cari et al. .................. 123/490 |
| 6,518,763 B2 * | 2/2003 | Sollart ........................ 324/378 |
| 6,532,940 B1 * | 3/2003 | Ono et al. .................. 123/490 |
| 6,578,553 B1 | 6/2003 | Schubert et al. |
| 2001/0047681 A1 | 12/2001 | Burkardt et al. |
| 2003/0154709 A1 * | 8/2003 | Kadowaki et al. ............. 60/276 |

FOREIGN PATENT DOCUMENTS

| DE | 19703891 | 8/1998 |
| DE | 10309609 A1 * | 9/2003 |
| EP | 0785358 | 7/1997 |
| EP | 0857867 | 8/1998 |
| EP | 0860601 | 8/1999 |
| EP | 1118761 | 7/2001 |
| EP | 1201905 | 5/2002 |
| EP | 1310655 | 5/2003 |
| EP | 10309609 | 9/2003 |
| FR | 2716719 | 9/1995 |
| JP | 10252615 | 9/1998 |
| JP | 2001 207933 | 8/2001 |
| JP | 2003 328812 | 11/2003 |
| JP | 2005 337106 | 12/2005 |
| WO | WO 2005/047690 | 5/2005 |

* cited by examiner

*Primary Examiner* — Freddie Kirkland, III
(74) *Attorney, Agent, or Firm* — Kenyon & Kenyon LLP

(57) ABSTRACT

In a method and a device for testing for leakage in a fuel injection valve of an internal combustion engine, a temperature quantity is determined that characterizes the temperature of at least a part of the fuel injection valve. On the basis of this temperature quantity, the presence of a leak is inferred.

19 Claims, 3 Drawing Sheets

Figure 1:
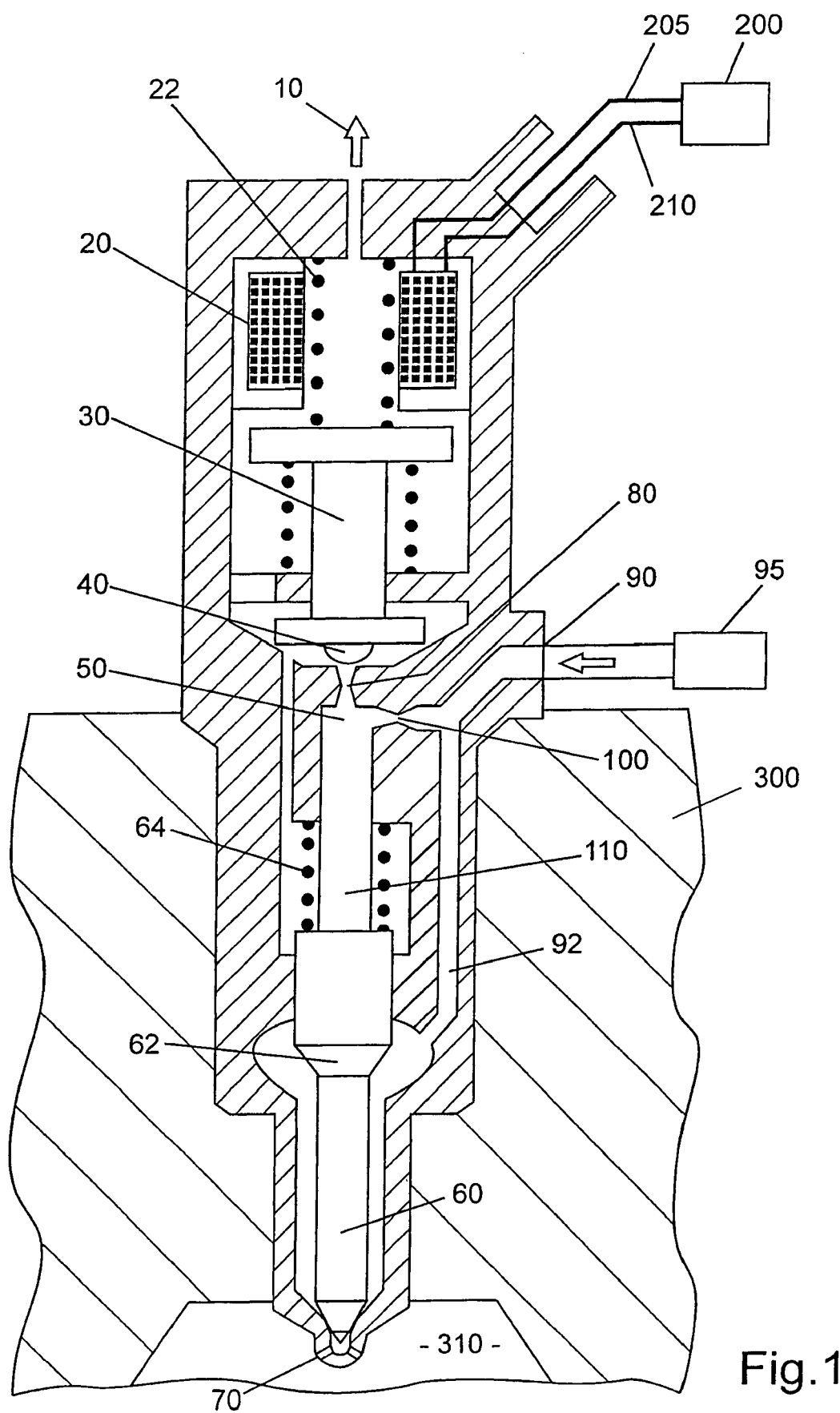

METHOD AND DEVICE FOR CHECKING FOR LEAKAGE IN A FUEL INJECTION VALVE OF AN INTERNAL COMBUSTION ENGINE

FIELD OF THE INVENTION

The present invention relates to a method and to a device for checking for leakage in a fuel injection valve of an internal combustion engine, having an actuator by which a connection of the fuel injection valve to a high-pressure fuel source is controlled at least indirectly by an electrical control unit, as recited in the preambles of the independent claims.

BACKGROUND OF THE INVENTION

In motor vehicles having an internal combustion engine, the fuel is conveyed from a fuel tank with the aid of a fuel pump, and is supplied to the fuel injection valves, also called injectors, via fuel lines. Excess fuel standardly flows back to the fuel tank via a return line. In internal combustion engines having high-pressure injection, in particular in internal combustion engines having self-ignition, an additional pump is connected to the fuel pump that produces a very high pressure in a high-pressure area, also called a rail, that is connected to the injectors. In such fuel supply systems, there is the danger of a leak in the high-pressure part, so that fuel flows into the return line. This is standardly called an internal leak. In addition, leakage to the outside is possible, in which the fuel flows into the engine compartment under high pressure. Increased leakage of an injector results in a lasting decrease in the rail pressure. This can result in a defect of the internal combustion engine.

German Patent Publication No. DE 197 03 891, a method and a device are known for recognizing a leak in a fuel supply system of an internal combustion engine, in particular an internal combustion engine having a common-rail system, in which a pressure sensor acquires the pressure in the high-pressure area. Here, at least two pressure values are acquired at different times, and from these two pressure values a fuel quantity balance is determined, and the presence of a fault is inferred on the basis of the fuel quantity balance. While such a method and such a device can recognize a leak in a general fashion, it is however not possible to recognize a cylinder-specific leak in this way. In the case of a leak, it is thus necessary to exchange all the injectors, even if for example only one injector has a leak. This is disadvantageous not only from the point of view of cost, but also because the exchange of all the injectors requires considerable assembly work.

In addition, for workshop purposes only, an individual-injector-specific leak measurement is known that uses a measurement tube at the injector; however, this is used only for passenger vehicles, and in addition is not accepted by all vehicle manufacturers, because the leakage measurement requires open handling of fuel while the internal combustion engine is running, which presents a significant safety risk.

The present invention is therefore based on the object of disclosing a method and a device for checking for leaks in a fuel injection valve of an internal combustion engine, by which it is possible to determine in a simple and reliable manner whether an individual injector has a leak.

SUMMARY OF THE INVENTION

In a method and device for checking for leaks in a fuel injection valve of an internal combustion engine of the type named above, this object is achieved through the features of Claims 1 and 9.

The present invention makes use of the empirically discovered fact that a leak strongly heats the body of the injector, including its added-on parts. The basic idea of the present invention is therefore to acquire a temperature quantity that characterizes the temperature of at least a part of the fuel injection valve, and to infer the presence of a leak therefrom. As a temperature quantity, the temperature can be measured immediately using a sensor. It is particularly advantageous for the temperature quantity to be derived from electrical quantities. Thus, the resistance of the coil of a magnetic valve is dependent on the temperature of the coil. That is, the resistance results from the acquisition of the current and voltage values. On the basis of the resistance, the temperature is then calculated. Here, it is particularly advantageous that one of the measurement quantities, such as for example the current or the voltage, or a calculated quantity, such as for example the resistance, can also be used as a temperature quantity. In the following, this temperature quantity is simply designated the temperature.

Because in the case of a defect the leakage does not increase in jumps, but rather continuously, in this way a temperature measurement can be used to detect and exchange faulty injectors before a total failure of the internal combustion engine occurs.

The method can be used particularly advantageously in a magnetic valve. In this case, the temperature of a magnetic coil of the magnetic valve is acquired, and the presence of a leak is inferred therefrom.

It is particularly advantageous that the leak measurement can be made without measuring the individual return quantities of the injectors. In this way, the expense of the measurement is significantly reduced. In systems in which the individual return quantities cannot be measured, or can be measured only with difficulty, a diagnosis is possible only in this way.

Here, the presence of a leak is always inferred if the temperature quantity exceeds a predeterminable threshold value and/or if the time gradient of the temperature quantity exceeds a predeterminable further threshold value and/or if a the temporal change of the time gradient of the temperature quantity exceeds a predeterminable further threshold value.

In order to improve the leak recognition, the temperature of the internal combustion engine is taken into account in the determination of the predeterminable threshold values, because the temperature can have a falsifying effect on the coil temperature. Here, even the temperature quantity of a single cylinder is preferably acquired, because temperature gradients can occur inside the internal combustion engine.

In principle, the temperature quantity can be acquired in a wide variety of ways, for example also using temperature sensors or the like. This makes sense in particular if piezoactuators are used. In an advantageous specific embodiment, the temperature quantity is determined from the coil current, here preferably from the pulse-duty ratio of a holding current regulation. Preferably, the temperature quantity is determined from the height of the current level for a fixedly predetermined pulse-duty ratio. In this way, already-existing control units can be used, and additional sensor elements are not required. It is particularly advantageous if, in phases in which no controlling of the actuator takes place, this actuator is charged with a testing current. Preferably, here a constant current is selected, and the temperature quantity is determined from the height of the voltage that results.

This means that the temperature quantity is determined from the ratio of voltage and current, each of these compared quantities being held constant at the actuator while the other quantity is measured.

The procedure according to the present invention can be carried out both during driving operation by the standard control unit that controls the internal combustion engine during driving operation and also in the context of maintenance operation by a diagnosis tester, also called a tester in the following. Here, a measurement can be carried out without modification in the control device, even in older vehicles. This means that an arbitrary division of the individual elements and tasks to the control unit and the tester is possible. That is, the means for carrying out the procedure according to the present invention are at least partly a component of the control unit, and/or the means for carrying out the procedure according to the present invention are at least partly a component of the tester.

It is particularly advantageous if the difference between two temperature quantities measured at different rail pressures is evaluated.

DRAWING

Additional advantages and features of the present invention are the subject matter of the following description, as well as of the graphic representation of an exemplary embodiment of the present invention.

Figure 2:
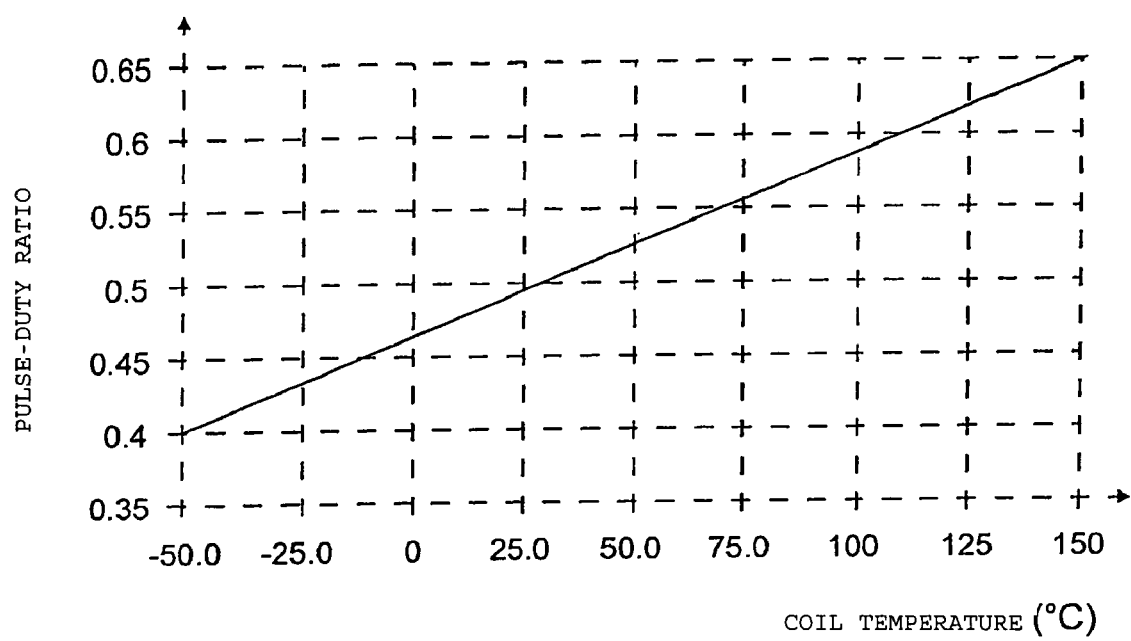

FIG. 1 shows a schematic sectional representation of a device according to the present invention having a magnetic valve injector;

FIG. 2 schematically shows the pulse-duty ratio over the coil temperature, and

Figure 3:
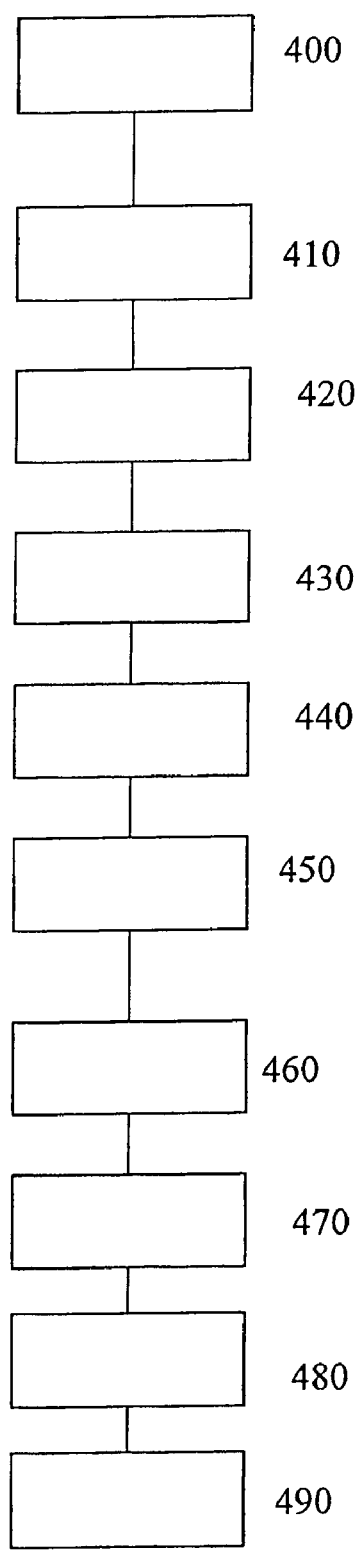

FIG. 3 shows a flow diagram of a specific embodiment of the procedure.

DESCRIPTION OF THE EXEMPLARY EMBODIMENTS

The beginning of the injection and the injection quantity are set using an electrically controllable injector installed in a cylinder 300 of an internal combustion engine, e.g. a magnetic injector valve shown in FIG. 1. The fuel is conveyed from a fuel high-pressure source 95, which for example in a common-rail system includes at least one high-pressure fuel pump and a high-pressure storage device (rail), via a high-pressure terminal 90 into a high-pressure inlet duct 92 to an injection nozzle 60, also called a nozzle needle, and is also conveyed via a supply throttle 100 into a valve control chamber 50. Valve control chamber 50 is connected to a fuel return line 10 via an output throttle 80, which can be opened by a magnetic valve formed from a magnetic coil 20, a magnet armature 30, and a valve ball 40.

In the closed state of outlet throttle 80, the hydraulic force against a valve piston 110 predominates in relation to the force on a pressure shoulder 62 of nozzle needle 60. As a result, nozzle needle 60 is pressed into its seat, and closes high-pressure inlet duct 92 tightly against the engine compartment (not shown). When the motor is not running, and there is a lack of pressure for example in the high-pressure storage device, a nozzle spring 64 closes the injector.

When the magnetic valve—i.e. magnet coil 20 and therewith magnet armature 30 and valve ball 40—is driven, output throttle 80 is opened in that valve ball 40 is removed from its seating. Inlet throttle 100 prevents a complete pressure compensation, so that the pressure in valve control chamber 50, and thus the hydraulic force on valve piston 110, decreases. As soon as the hydraulic force falls below the force acting on pressure shoulder 62 of nozzle needle 60, nozzle needle 60 opens. The fuel now travels through injection holes 70 into a combustion chamber 310 of an engine. When the magnetic valve is no longer driven (magnet coil 20), magnet armature 30 is pressed downward by the force of valve spring 22. Valve ball 40 closes output throttle 80. This causes a pressure to build up again in valve control chamber 50 via the inflow of inlet throttle 100, this pressure corresponding to the rail pressure. This greater pressure exerts a higher force on valve piston 110, so that nozzle needle 60 again closes. The throughput of inlet throttle 100 determines the closing speed of nozzle needle 60.

This indirect controlling of nozzle needle 60 via a hydraulic force amplification system is used because the forces required for a fast opening of nozzle needle 60 cannot be produced using the magnetic valve. The control quantity required in addition to the injected fuel quantity flows into fuel return line 10 via throttles of the control chamber.

In the case of a leak, the injector body, including its added-on parts, is now strongly heated. The leakage quantity itself is likewise hot, and heats the magnet armature 30 and magnet coil 20 situated in the fuel return line. The basic idea of the invention is to infer the presence of a leak from the temperature of at least a part of the injector, in particular the temperature of magnet coil 20.

The temperature of magnet coil 20 is determined in a control unit 200, for example via the pulse-duty ratio of a known holding current regulation. Here, connecting lines 205, 210, which are required anyway for the controlling of magnet coil 20, are used to determine the temperature, so that additional lines are not required, which is particularly advantageous. The coil temperature is determined for example from the height of the current level given a fixedly predetermined pulse-duty ratio.

As is shown in FIG. 2, the pulse-duty ratio of the holding current regulation changes proportional to the coil temperature. From the pulse-duty ratio of the holding current regulation, the temperature of magnet coil 20 can therefore be inferred.

If the temperature of magnet coil 20 exceeds a predeterminable threshold value, and/or if a predeterminable time gradient of the temperature and/or a predeterminable value of the temporal change in the time gradient of the temperature exceeds predeterminable threshold values, a leak of the fuel injection valve is inferred. In order to exclude errors in the leak measurement, the temperature of the engine, and in particular the temperature of the single cylinder 300 in which the fuel injection valve is installed, must be taken into account in the determination of the threshold values.

The procedure described above is preferably suitable for running operation of the internal combustion engine. That is, the method is carried out during the operation of the internal combustion engine. It is particularly advantageous if the method according to the present invention is carried out and/or initialized by an external diagnostic tester. This then takes place in the context of maintenance in a workshop.

With the use of such a diagnostic tester, also called simply a tester in the following, the application of the procedure described in the following is particularly advantageous. This method can also be carried out during driving operation by the control unit.

The measurement of the temperature here preferably takes place in a phase in which no injections take place. The measurement can take place in the pause between two injections, or in a phase in which no fuel is metered. For the measurement, the actuator is charged with a constant current. The resistance of the actuator, and thus the temperature of the actuator, result from the ratio between the current and the voltage, which are either known or are measured, At the most easily accessible point, the cable harness is divided at a plug connection, and the tester is coupled in between the engine control device and the injector using an adapter plug. In this way, the tester obtains a measurement sample from the electrical injector terminals.

For the temperature measurement, or the resistance measurement, via a corresponding triggering the available pause between the injection controllings of the engine control device is determined at the injector. In these pauses, the tester impresses a constant measurement current onto the injectors. A voltage drop arises, which is acquired. On the basis of the impressed current and the measured voltage, the resistance, and thus the temperature, are calculated.

This measurement sequence is carried out in automated fashion for each injector at a low rail pressure and at a high rail pressure. By evaluating the difference ΔT of the temperature at the different rail pressures, the influence of various thermal basic states that result from the respective cylinder position can be eliminated. If the difference ΔT of a cylinder exceeds a predetermined boundary value, this injector is recognized as faulty.

In FIG. 3, the testing sequence is shown on the basis of a flow diagram. In step 400, the testing program starts. In step 410, a pressure actuator is controlled in such a way that a first rail pressure level arises. In step 420, a time duration is permitted to elapse in which the temperature of the injector stabilizes at the set rail pressure level. In step 430, the coil temperature of all cylinders is determined through charging with a constant current and acquisition of the voltage drop. In step 440, the pressure actuator is driven in such a way that a second rail pressure level arises. Preferably, the second rail pressure level is significantly higher than the first rail pressure level. In step 450, a time duration is allowed to elapse in which the temperature of the injector stabilizes at the set rail pressure level. In step 460, the coil temperature of all cylinders is determined by charging with a constant current and acquiring the voltage drop. Subsequently, in step 470 the differences ΔT between the two temperature values at the different rail pressures are determined and are compared with a boundary value. If the determine difference for at least one of the cylinders is greater than a boundary value, an error is recognized. In step 480, the result is displayed. The testing method terminates in step 490.

What is claimed is:

1. A non-transitory computer readable medium having a computer program, which is executable by a processor, comprising:
   a program code arrangement having program code for testing for leakage in a fuel injection valve of an internal combustion engine, by performing the following:
      determining a temperature quantity that characterizes a temperature of at least a part of the fuel injection valve; and
      inferring a presence of a leak into one of at least (i) a return line, and (ii) an engine compartment from the temperature quantity,
   wherein a coil temperature of the fuel injection valve is used to detect the leakage,
   wherein the temperature quantity is determined in phases in which an actuator is not triggered during a running operation of the internal combustion engine.
2. The non-transitory computer readable medium as recited in claim 1, wherein the temperature quantity is determined from a pulse-duty ratio of a holding current regulation.
3. The non-transitory computer readable medium as recited in claim 2, wherein the temperature quantity is determined from a height of the current level for a fixedly predetermined pulse-duty ratio.
4. The non-transitory computer readable medium as recited in claim 2, wherein the temperature quantity is determined from a ratio of voltage and current, in each case one of these compared quantities on the actuator being constant while the other quantity is measured.
5. The non-transitory computer readable medium as recited in claim 2, wherein the pulse-duty ratio of the holding current regulation changes proportional to the coil temperature.
6. The non-transitory computer readable medium as recited in claim 1, wherein a difference of two temperature quantities is evaluated at different fuel pressures.
7. The non-transitory computer readable medium as recited in claim 1, wherein the presence of a leak is inferred for at least one of the following conditions: (i) if the temperature quantity exceeds a predeterminable threshold value, (ii) if a time gradient of the temperature quantity exceeds the predeterminable further threshold value, (iii) and if a temporal change in the time gradient quantity exceeds the predeterminable further threshold value.
8. The non-transitory computer readable medium as recited in claim 7, wherein a temperature of the internal combustion engine is taken into account in the determination of the threshold values.
9. The non-transitory computer readable medium as recited in claim 7, wherein a temperature of a cylinder of the internal combustion engine in which the fuel injection valve is installed is taken into account in the determination of the threshold values.
10. The non-transitory computer readable medium as recited in claim 1, wherein the leak measurement is made without measuring individual return quantities of the fuel injection valve.
11. The non-transitory computer readable medium as recited in claim 1, wherein the part of the fuel injection valve includes a magnet coil.
12. The non-transitory computer readable medium as recited in claim 1, wherein the temperature quantity for the fuel injection valve is determined from a pulse-duty ratio of a holding current regulation, and wherein a cylinder specific leak is recognized.
13. The non-transitory computer readable medium as recited in claim 12, wherein the leak measurement is made without measuring individual return quantities of each of a plurality of fuel injection valves, wherein the part of each of a plurality of fuel injection valves includes a magnet coil, and wherein the pulse-duty ratio of the holding current regulation changes proportional to the coil temperature.
14. The non-transitory computer readable medium as recited in claim 1, wherein the leak measurement is made without measuring individual return quantities of the fuel injection valve, wherein the part of the fuel injection valve includes a magnet coil, and wherein the pulse-duty ratio of the holding current regulation changes proportional to the coil temperature.
15. The non-transitory computer readable medium as recited in claim 14, wherein the temperature quantity for each of a plurality of fuel injection valves is determined from a pulse-duty ratio of a holding current regulation, and wherein a cylinder specific leak is recognized.
16. A device for testing for leakage in a fuel injection valve of an internal combustion engine, comprising:

a first arrangement for determining a temperature quantity that characterizes a temperature of at least a part of the fuel injection valve; and a second arrangement for inferring a presence of a leak into one of at least (i) a return line, and (ii) an engine compartment from the temperature quantity, wherein a coil temperature of the fuel injection valve is used to detect the leakage, wherein the temperature quantity is determined in phases in which an actuator is not triggered during a running operation of the internal combustion engine.

17. The device as recited in claim 16, further comprising: a magnetic valve serving as an actuator.

18. The device as recited in claim 16, wherein the first and second arrangements are at least partially a component of a control unit that controls the internal combustion engine in driving operation.

19. The device as recited in claim 16, wherein the first and second arrangements are at least partially a component of a diagnostic tester.

* * * * *